(12) United States Patent
Imaseki et al.

(10) Patent No.: US 7,358,003 B2
(45) Date of Patent: Apr. 15, 2008

(54) COOLING STRUCTURE FOR FUEL CELL VEHICLE

(75) Inventors: Mitsuharu Imaseki, Saitama (JP); Yoshirou Shimoyama, Saitama (JP); Hiroyuki Hattori, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 618 days.

(21) Appl. No.: 10/719,564

(22) Filed: Nov. 20, 2003

(65) Prior Publication Data
US 2004/0106027 A1    Jun. 3, 2004

(30) Foreign Application Priority Data
Nov. 20, 2002 (JP) .............................. 2002-336689

(51) Int. Cl.
*H01M 8/04* (2006.01)
(52) U.S. Cl. .................. 429/28; 180/229; 180/68.4; 903/908
(58) Field of Classification Search ................. 429/26; 903/908
See application file for complete search history.

(56) References Cited

U.S. PATENT DOCUMENTS 3,929,202 A * 12/1975 Hobbensiefken ........... 180/68.4
4,632,206 A * 12/1986 Morinaka et al. ........... 180/229
6,448,535 B1 * 9/2002 Ap ............................. 219/208
6,595,433 B2 * 7/2003 Ap et al. .................. 237/12.3 B

FOREIGN PATENT DOCUMENTS

| JP | 6-239147 | 8/1994 |
|---|---|---|
| JP | 2000-315513 | 11/2000 |
| JP | 2002-141079 | 5/2002 |

* cited by examiner

Primary Examiner—Mark Ruthkosky
(74) Attorney, Agent, or Firm—Lahive & Cockfield, LLP; Anthony A. Laurentano, Esq.

(57) ABSTRACT

The cooling structure for a fuel cell vehicle comprises a fuel cell, a drive motor for driving the fuel cell vehicle using the energy generated by the fuel cell, a first cooling flow passage for cooling the fuel cell using a main radiator, and a second cooling flow passage for cooling the drive motor or the power control unit of the drive motor using auxiliary radiators. The main radiator is disposed in the central portion of the front surface of a vehicle body. The auxiliary radiators are respectively disposed on the front surface of the vehicle body in such a manner that their heat exchange surface are situated shifted in the vehicle-width direction so as to prevent them from being overlapped with the heat exchange surface of the main radiator.

10 Claims, 3 Drawing Sheets

COOLING STRUCTURE FOR FUEL CELL VEHICLE

BACKGROUND OF THE INVENTION

1. Field of the Invention

The present invention relates to a cooling structure which is used to cool a fuel cell of a fuel cell vehicle as well as a drive motor and the like of the fuel cell vehicle.

2. Description of the Related Art

As a cooling structure for a fuel cell vehicle, there is known a cooling structure which cools the drive motor, control unit and the like of the fuel cell vehicle and the fuel cell of the fuel cell vehicle independently of each other (for example, see JP-A-2000-315513). Also, there is known a structure in which a radiator is disposed in a rear portion of a vehicle body to thereby secure a wide cooling area (for example, see JP-A-2002-141079).

The above-cited former cooling structure is excellent in that it can cool the drive motor, control unit and the like and the fuel cell independently of each other. However, not only because the radiators thereof are disposed in the front and rear portions of the vehicle body, the ventilation resistance thereof is large, but also because the radiator disposed in the rear portion is thermally influenced by the heat generated by the radiator disposed in the front portion, it is difficult to obtain the desired cooling performance. Also, the latter cooling structure has an advantage that it can secure a wide cooling area in the rear portion of the vehicle body. However, since the rate of use of the running wind is low, it is difficult to obtain the desired cooling performance and it is also difficult to arrange pipes properly.

SUMMARY OF THE INVENTION

In view of the above drawbacks of the above-cited related-art cooling structures, it is an object of the invention to provide a cooling structure for a fuel cell vehicle which makes effective use of the vehicle body space of the fuel cell vehicle to thereby be able to enhance its cooling performance for cooling a fuel cell and a drive motor.

In solving the above problems, according to a first aspect of the invention, there is provided a cooling structure for a fuel cell vehicle, comprising:

a fuel cell (for example, a fuel cell 2 used in the illustrated embodiment of the invention);

a drive motor (for example, a drive motor 3 used in the illustrate embodiment) for driving the fuel cell vehicle using the energy generated by the fuel cell;

a first cooling flow passage (for example, a first cooling flow passage 5 used in the illustrated embodiment) for cooling the fuel cell using a first cooling medium cooled by a main radiator (for example, a main radiator 4 used in the illustrated embodiment); and a second cooling flow passage (for example, a second cooling flow passage 7 used in the illustrated embodiment) for cooling at least one of the drive motor and a power control unit (for example, a power control unit 50 used in the illustrated embodiment) of the drive motor using a second cooling medium cooled by an auxiliary radiator. (for example, two auxiliary radiators 6 used in the illustrated embodiment), wherein the main radiator is disposed in a central portion of a front surface of a vehicle body and the auxiliary radiator is disposed on the front surface of the vehicle body in such a manner that its heat exchange surface (for example, heat exchange surfaces 6A used in the illustrated embodiment) is situated shifted in a vehicle-width direction so as to prevent it from being overlapped with a heat exchange surface (for example, a heat exchange surface 4A used in the illustrated embodiment) of the main radiator.

Thanks to this structure, not only the fuel cell and drive motor (or the power control unit of the drive motor) can be cooled independently of each other, but also the main and auxiliary radiators can be prevented from being thermally influenced by each other.

According to a second aspect of the invention, there is provided a cooling structure for a fuel cell vehicle, comprising:

a fuel cell;

a drive motor for driving the fuel cell vehicle using the energy generated by the fuel cell;, a first cooling flow passage for cooling the fuel cell using a first cooling medium cooled by a main radiator; and a second cooling flow passage for cooling at least one of the drive motor and a power control unit of the drive motor using a second cooling medium cooled by an auxiliary radiator, wherein the main radiator is disposed on a front surface of the vehicle body so as to extend substantially over a vehicle-width-direction entire area existing between a pair of right and left main frames (for example, main frames 22 used in the illustrated embodiment) respectively disposed along a back-and-forth direction of the vehicle body, and the auxiliary radiator is disposed on the front surface of the vehicle body in such a manner that it is situated outside the main frames.

Thanks to this structure, the fuel cell and drive motor (or the power control unit of the drive motor) can be cooled independently of each other by the main and auxiliary radiators which are disposed with the main frames between them. Further, since the main and auxiliary radiators can be partitioned by the main frames, the main and auxiliary radiators can be prevented from being thermally influenced by each other.

According to a third aspect of the invention, in a cooling structure for a fuel cell vehicle as set forth in the first or second aspect, the auxiliary radiator is disposed in such a manner that its heat exchange surface faces obliquely forwardly and outwardly.

Thanks to this structure, the exhaust air of the auxiliary radiator can be joined with the exhaust air of the main radiator and, after then, the exhaust air of the main and auxiliary radiators can be discharged.

According to a fourth aspect of the invention, in a cooling structure for a fuel cell vehicle as set forth in the first or second aspect, the main radiator is disposed in such a manner that its heat exchange surface faces obliquely upwardly and forwardly.

Thanks to this structure, the exhaust air can be directed downwardly and the crashable zone of the front portion of the vehicle can be secured large by an amount corresponding to the backwardly retreated upward portion of the main radiator, thereby being able to reduce the front height of the vehicle body accordingly.

According to a fifth aspect of the invention, in a cooling structure for a fuel cell vehicle as set forth in the first or second aspect, between the main and auxiliary radiators, there are interposed seal members (for example, main seal members 23 used in the illustrated embodiment) for closing a space existing between the main and auxiliary radiators.

Thanks to this structure, the exhaust air from the respective radiators can be prevented from flowing into around the other radiators.

According to a sixth aspect of the invention, in a cooling structure for a fuel cell vehicle as set forth in the first or second aspect, the installation height of the auxiliary radiator is set lower than the main radiator.

Thanks to this structure, the auxiliary radiator has no ill influences on the freedom of arrangement of functional parts to be disposed in the rear of a head lamp or the like.

DETAILED DESCRIPTION OF THE INVENTION

Now, description will be given below of the mode for carrying out the invention with reference to the accompanying drawings.

Figure 1:
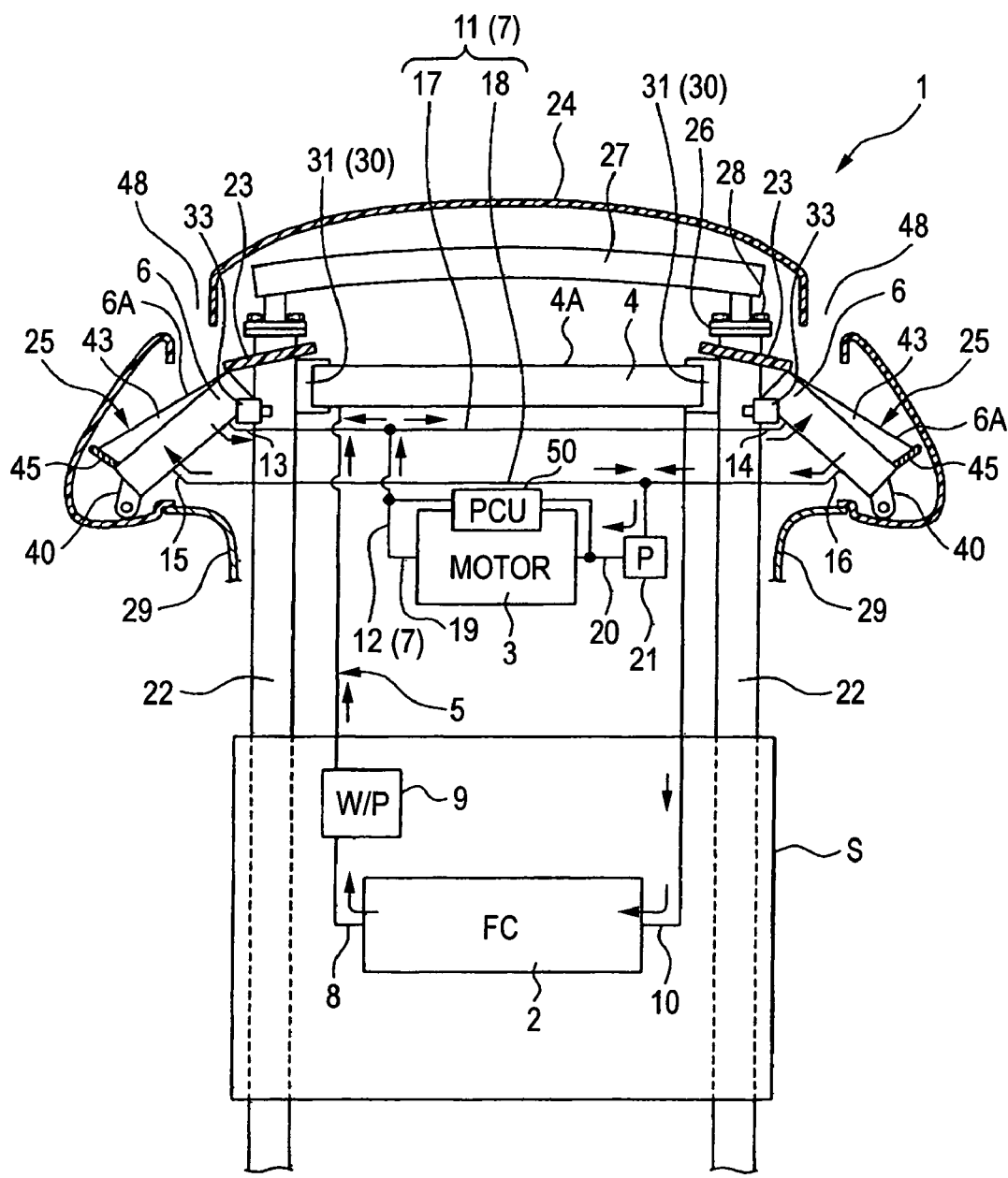
FIG. 1 is a sectional plan view of a fuel cell vehicle incorporating therein a cooling structure according to an embodiment of the invention.

As shown in FIG. 1, a fuel cell vehicle 1 comprises a fuel cell (FC) 2, a drive motor (MOT) 3, a power control unit (PCU) 50, a first cooling flow passage 5, and a second cooling flow passage 7. The fuel cell 2 is disposed in a storage box S. The drive motor 3 drives the vehicle using the energy generated by the fuel cell 2. The power control unit 50 controls the power of the drive motor 3. The first cooling flow passage 5 cools the fuel cell 2 using a main radiator 4. The second cooling flow passage 7 cools the drive motor 3 and the power control unit 50 of the drive motor 3 using two auxiliary radiators 6.

The fuel cell 2 is structured in such a manner that a plurality of cells are stacked, each cell being formed by holding a solid polymer electrolyte membrane composed of e.g. a solid polymer ion-exchange membrane from both sides by and between an anode electrode and a cathode electrode, in turn, holding by and between a pair of separators. In case where hydrogen gas serving as fuel gas is supplied to the anode electrode and the air including oxygen servings as an oxidizing agent gas is supplied to the cathode electrode, hydrogen ions generated due to the catalytic reaction in the anode electrode move through the solid polyelectrolyte membrane up to the cathode electrode. Then, in the cathode electrode, the hydrogen ions react with the oxygen electrochemically to generate electricity, thereby generating water. This reaction is an exothermic reaction and thus, the temperature of the fuel cell 2 must be controlled to about 70° C. in order to secure the efficiency of the reaction.

The drive motor 3 is used to drive and run the fuel cell vehicle 1 using the electric energy of a storage device such as the fuel cell 2 or a capacitor (not shown) or a high-tension battery (not shown). In the speed reducing time of the vehicle, the drive motor 3 also functions as a generator and charges the storage device.

The power control unit 50 is used to control the supply amount of the power to be supplied to the drive motor 3 and is disposed together with the drive motor 3 in the front portion of the fuel cell vehicle (upwardly of the drive motor 3).

The first cooling flow passage 5 is a flow passage which connects a cooling flow passage (not shown) in the fuel cell 2 with the main radiator 4 (which will be discussed later) disposed in the central portion of the front side of the vehicle body. This first cooling flow passage 5 is independent of a second cooling flow passage 7 (which will be discussed later) and cools the fuel cell 2 using a first cooling medium (which belongs to ethylene glycol) cooled by the main radiator 4. By the way, since the first cooling medium flows through a cooling passage within the fuel cell 2, differently from a second cooling medium (which will be discussed later), the amounts of additives to be added to the first cooling medium are reduced as much as possible.

Here, in the first cooling flow passage 5, between the main radiator 4 and the exit-side port 8 of the fuel cell 2, there is interposed a first pump (W/P) 9. In case where the first pump 9 is driven, the first cooling medium is forcibly circulated in the first cooling flow passage 5, and the first cooling medium cooled by the main radiator 4 is supplied to the fuel cell 2 to thereby cool the same. By the way, reference character 10 designates the entrance-side port of the fuel cell 2.

The second cooling flow passage 7 is a flow passage which connects a cooling flow passage (not shown) for the drive motor 3 and the power control unit 50 of the drive motor 3 with a pair of the auxiliary radiators 6, 6 (which will be discussed later) respectively disposed in the two side portions of the front side of the vehicle body. The second cooling flow passage 7 is used to cool the drive motor 3 using the second cooling medium (which belongs to ethylene glycol) cooled by the auxiliary radiators 6. By the way, the second cooling medium is a refrigerant into which additives are mixed to thereby restrict the deterioration thereof and extend the life thereof.

Specifically, the second cooling flow passage 7 includes a main flow passage 11 for connecting together the pair of auxiliary radiators 6, and a subordinate flow passage 12 which is connected not only to the main flow passage 11 but also to the cooling flow passage for the drive motor 3 and the power control unit 50 of the drive motor 3.

The main flow passage 11 includes a front flow passage 17, and a rear flow passage 18. The front flow passage 17 connects the exit-side port 13 of the front side of the left-side auxiliary radiator 6 and the entrance-side port 14 of the front side of the right-side auxiliary radiator 6. The rear flow passage 18 connects the entrance-side port 15 of the rear side of the left-side auxiliary radiator 6 and the exit-side port 16 of the rear side of the right-side auxiliary radiator 6.

The subordinate flow passage 12 not only connects the exit-side port 19 of the drive motor 3 with the front flow passage 17 of the main flow passage 11 but also connects the entrance-side port 20 of the drive motor 3 with the rear flow passage 18 of the main flow passage 11. And, between the rear flow passage 18 and the entrance-side port 20 of the drive motor 3, there is interposed a second pump (P) 21. In case where the second pump 21 is driven, the second cooling medium is forcibly circulated in the second cooling flow passage 7 and the second cooling medium cooled by the auxiliary radiators 6 is supplied to the drive motor 3 to thereby cool the same.

Here, the main radiator 4 is disposed in the central portion of the front surface of the vehicle body, whereas the auxiliary radiators 6 are respectively disposed on the front surface of the vehicle body and on the two sides of the main radiator 4 in such a manner that they are not overlapped with the main radiator 4. Specifically, the main radiator 4 is disposed on the front surface of the vehicle body in such a manner that it extends substantially over the vehicle-width-direction entire area between a pair of right and left main frames 22 respectively disposed along the back-and-forth direction of the vehicle body. The auxiliary radiators 6 are respectively disposed on such portions of the front surface of the vehicle body that are present outside of their associated main frames 22.

Here, the main radiator 4 is disposed inclined in such a manner that the heat exchange surface 4A thereof faces obliquely upwardly and forwardly, while the auxiliary radiators 6 are disposed inclined such that the heat exchange surfaces 6A thereof face obliquely forwardly and outwardly. By the way, the auxiliary radiators 6 are also formed such that the installation heights thereof are lower and the height dimensions thereof are smaller than the main radiator 4.

Between the main radiator 4 and auxiliary radiators 6, there are interposed main seal members (which will be discussed later) 23, 23 serving as seal members for closing spaces formed between the main and auxiliary radiators 4 and 6 to thereby seal the same. Also, outside of the auxiliary radiators 6, there are disposed subordinate seal members (which will be discussed later) 25, 25 for closing and sealing spaces formed between the auxiliary radiators 6 and the inner surface of a bumper 24 to thereby seal the same.

A bumper beam 27 is fastened and fixed to the front end portions of the main frames 22 through flange portions 26 using bolts 28, while the bumper 24 constituting the front surface of the vehicle body is mounted on the bumper beam 27. The two side portions of the bumper 24 are respectively turned backwardly of the bumper 24 and are connected to their associated wheel house inner panels 29.

Next, description will be given below of a mounting structure for mounting the main radiator 4 and auxiliary radiators 6 including the vehicle body structure with reference to FIGS. 2 to 5.

Figure 2:
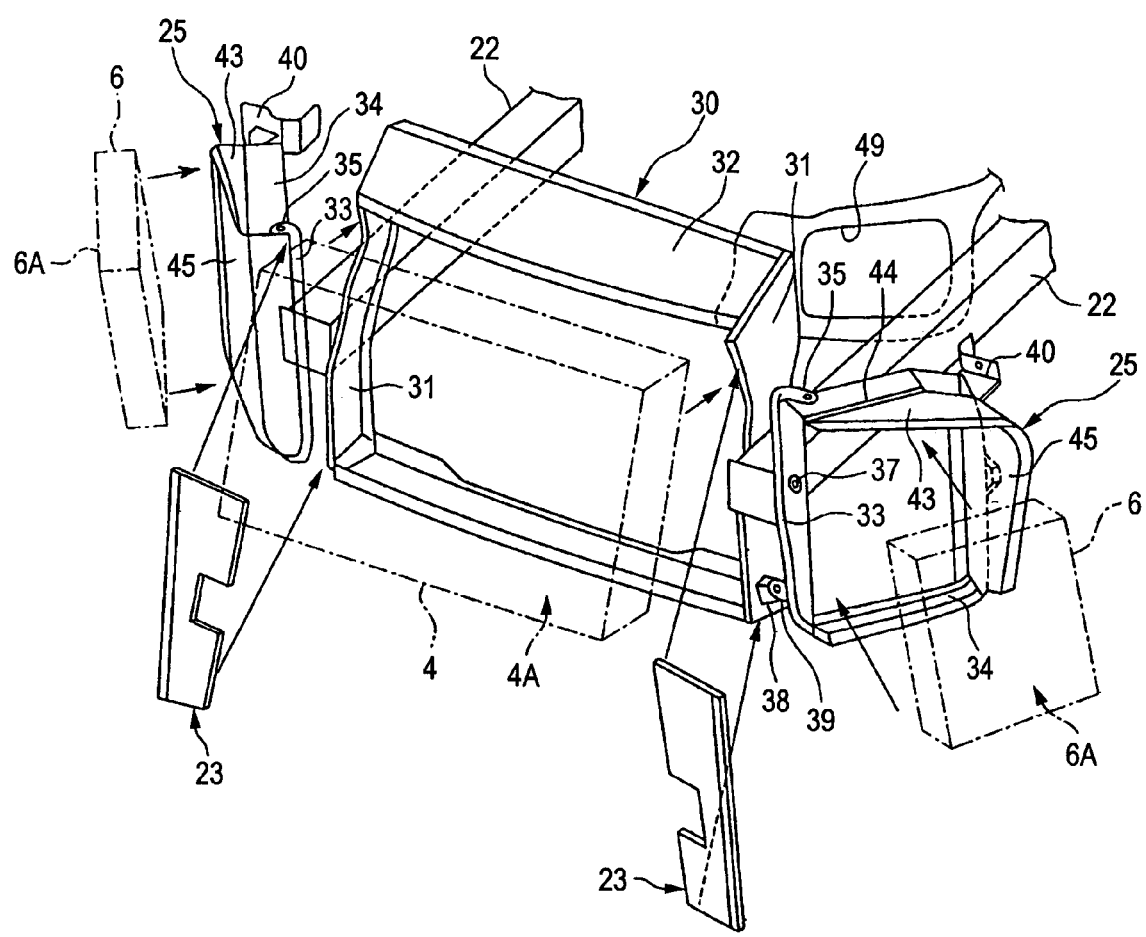
FIG. 2 is a perspective view of the main portions of the cooling structure according to the embodiment of the invention.

As shown in FIG. 2, on the inside walls of the front end portions of the main frames 22, there are mounted the outside walls 31 of a frame-shaped bulkhead 30. On the frame-shaped bulkhead 30, the main radiator 4 can be mounted by inserting the main radiator 4 from above the bulkhead 30 in a state where the upper side portion 32 of the bulkhead 30 is removed from the bulkhead 30. On the rear portion of the main radiator 4, there are mounted a radiator fan (not shown) and other parts (not shown); and thus, by sucking in the air from a front grille center 47 (which will be discussed later), the air can be supplied to the main radiator 4.

Figure 3:
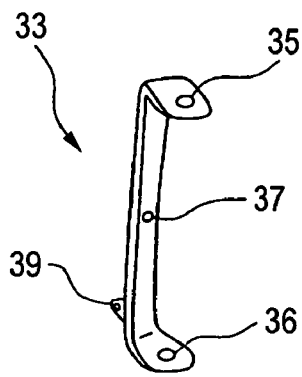
FIG. 3 is a perspective view of a support member employed in the embodiment of the invention.

On the outside portions of the main frames 22, there are mounted support members 33 respectively. Each of the support members 33, as shown in FIG. 3, is a U-shaped member. The support member 33 includes, in the upper and lower portions thereof, fixing portions 35, 36 for fixing the frame-shaped mounting frame 34 (shown in FIG. 2) of its associated auxiliary radiator 6 and, in the central portion thereof, a mounting portion 37 for mounting its associated main frame 22. Also, in the lower portion of the support member 33, there is disposed a mounting portion 39 which can be mounted onto the lower bracket 38 (shown in FIG. 2) of the bulkhead 30.

Referring to the structure of the mounting frame 34 of each auxiliary radiator 6, the vehicle room interior side thereof is supported on the support member 33 and the vehicle room exterior side thereof is supported on the wheel house inner panel 29 through a bracket 40. And, with the auxiliary radiator 6 mounted on the mounting frame 34, the auxiliary radiator 6 can be mounted on the vehicle body. On the rear portions of the respective auxiliary radiators 6, similarly to the main radiator 4, there are mounted a radiator fan (not shown) and other parts (not shown); and thus, by sucking in the air from a front grille side 48 (which will be discussed later), the air can be supplied to the auxiliary radiators 6.

Figure 4:
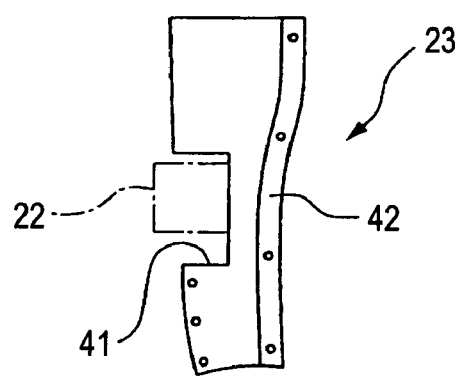
FIG. 4 is a perspective view of a main seal member employed in the embodiment of the invention.

Here, between the main radiator 4 and auxiliary radiators 6, there are interposed main seal members 23 which are respectively used to close the spaces formed between the main and auxiliary radiators. Each of the main seal members 23, as shown in FIG. 4, is a member which includes a cut-away portion 41 for escape of its associated main frame 22, and the main seal member 23 further includes a mounting portion 42 on the auxiliary radiator 6 side thereof. Since the spaces existing between the main radiator 4 and auxiliary radiators 6 can be closed, there can be eliminated the possibility that the exhaust air of the auxiliary radiators 6 can turn forwardly from the spaces between the main and auxiliary radiators to be thereby taken into the heat exchange surface 4A of the main radiator 4 again; and also, the open air flowing from the front side can be prevented from flowing through backwardly from the spaces.

Figure 5:
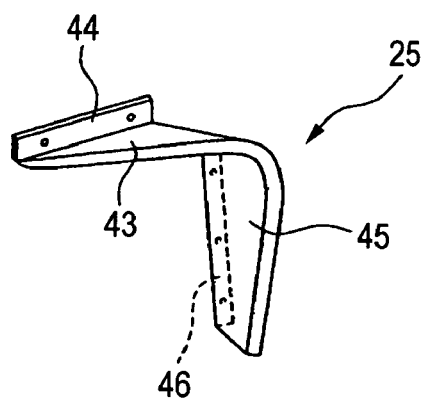
FIG. 5 is a perspective view of a subordinate seal member employed in the embodiment of the invention.

Also, on such portion of each auxiliary radiator 6 that extends over the upper and outside portions thereof, there is mounted a subordinate seal member 25. The subordinate seal member 25, as shown in FIG. 5, is a substantially L-shaped member. Specifically, the subordinate shield member 25 includes, in the rear edge of the upper seal portion 43 thereof, a mounting flange portion 44 to be fixed to the upper side portion of its associated auxiliary radiator 6. Also, in the rear edge of the side seal portion 45 thereof, the subordinate shield member 25 includes a mounting flange portion 46 to be fixed to the outside portion of its associated auxiliary radiator 6.

The upper seal portion 43 of the subordinate seal member 25 is closely contacted with the upper portion of the inner surface of the bumper 24, and the side seal portion 45 thereof is closely contacted with the side portion of the inner surface of the bumper 24 to thereby seal the spaces formed between the bumper 24 and subordinate seal member 25. Thanks to this, the exhaust air of the auxiliary radiators 6 can be prevented from turning for the main radiator 4. Further, the open air to be introduced into the auxiliary radiators 6 can be sealed without escaping from the sides thereof so that the air can be introduced into the heat exchange surfaces 6A of the auxiliary radiators 6 with high efficiency.

Figure 6:
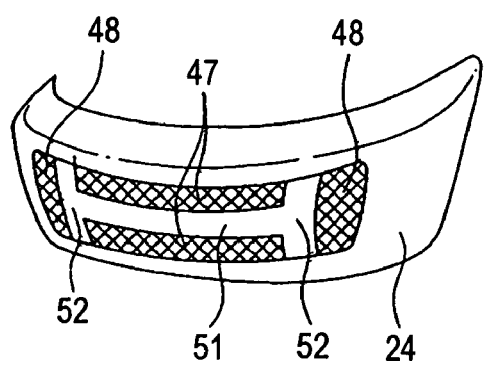
FIG. 6 is a perspective view of a bumper employed in the embodiment of the invention.

The thus-arranged main radiator 4 takes in the open air from the front grille center 47 (which is shown in FIG. 6) disposed in the front surface of the bumper 24, and the auxiliary radiators 6 take in the open air from the front grille sides 48, 48 respectively disposed in the two sides of the front surface of the bumper 24, so that the fuel cell 2 and drive motor 3 can be cooled by the first and second cooling mediums. The front grille center 47 is divided into upper and lower portions with a partition 51 which is disposed on the front surface of the above-mentioned bumper beam 27 so as to extend right and left; and, the front grille center 47 is also divided with partitions 52 which respectively extend in the vertical direction together with the front grille sides 48, 48. Thanks to this, the air to be sucked into the respective radiators 4, 6 are made difficult to be influenced by each other. Here, in a portion that is situated upwardly and backwardly of the installation portion of each auxiliary radiator 6, there is formed a head lamp mounting opening 49 (which is shown in FIG. 2).

According to the above embodiment, in case where the first pump 9 is driven to thereby allow the first cooling medium cooled by the main radiator 4 to flow through the first cooling flow passage 5 in such a manner as shown by the arrow mark in FIG. 1, the fuel cell 2 can be cooled. Also, in case where the second pump 21 is driven to thereby allow the second cooling medium cooled by the auxiliary radiators 6, 6 through the second flow passage 7 in such a manner as shown by the arrow mark in FIG. 1, the drive motor 3 can be cooled.

Thus, the fuel cell 2 and drive motor 3 can be cooled independently of each other. At the same time, since the main radiator 4 is disposed in the central portion of the front surface of the vehicle body and the auxiliary radiators 6, 6 are respectively disposed on the two sides of the main radiator 4 on the front surface of the vehicle body in such a manner that their heat exchange surfaces 6A are not overlapped with the heat exchange surface 4A of the main radiator 4, not only the main radiator 4 and auxiliary radiators 6 can be prevented from being influenced thermally by each other, but also the arrangement of the pipes can be made easy. Thanks to this, the cooling states of the fuel cell 2 and drive motor 3 can be controlled optimally with high efficiency.

Also, since the main radiator 4 and auxiliary radiators 6 are mounted on the main frames 22, the mounting operations thereof can be facilitated, which makes it possible to control the cooling states of the fuel cell 2 and drive motor 3 optimally with high efficiency while enhancing the mounting reliability thereof.

Here, because the auxiliary radiators 6 are disposed in such a manner that their heat exchange surfaces 6A face obliquely forwardly and outwardly, the exhaust air of the auxiliary radiators 6 can be made to join the exhaust air of the main radiator 4 and thus the exhaust air can be discharged together, so that the exhaust air can be made to flow smoothly with little stagnation. This makes it possible to realize high-efficiency cooling.

Also, since the main radiator 4 is disposed in such a manner that its heat exchange surface 4A faces obliquely upwardly and forwardly, the exhaust air thereof can be directed downwardly and the crushable zone of the front portion of the vehicle can be secured large by an amount corresponding to the backwardly retreated upper portion of the main radiator 4. Thanks to this, for the same heat exchange area, the front height of the vehicle body can be controlled down to a low level.

Therefore, not only the air ventilation efficiency can be enhanced to thereby improve the cooling performance, but also the expanded crashable zone can enhance the safety of the vehicle body, which can reduce the front height of the vehicle body. That is, the freedom of the design of the vehicle body can be enhanced and thus the visually confirming performance of the vehicle body for the driver can be secured.

Between the main radiator 4 and auxiliary radiators 6, there are interposed the main seal members 23, 23 for sealing the spaces formed between them and, on the outside of the auxiliary radiators 6, there are disposed the subordinate seal members 25, 25 for sealing the spaces respectively formed between the subordinate radiators 6 and the inner surface of the bumper 24.

That is, the main seal members 23, 23 can prevent the exhaust air of the auxiliary radiators 6 from turning forwardly from the spaces formed between the main and auxiliary radiators 4 and 6 into the heat exchange surface 4A of the main radiator 4 again, and also can prevent the open air taken in from the front side from flowing out backwardly from the spaces. The subordinate seal members 25, 25 can prevent the exhaust air of the auxiliary radiators 6 from turning for the main radiator and also can seal the open air introduced into the auxiliary radiators 6 without escaping from the side portions of the auxiliary radiators 6, thereby being able to introduce the open air onto the heat exchange surfaces 6A with high efficiency. As a result of this, the cooling performance can be enhanced greatly in both of the main radiator 4 and auxiliary radiators 6.

And, since the installation heights of the auxiliary radiators 6 can be set lower than the main radiator 4, the auxiliary radiators 6 have no ill influences on the freedom of arrangement of functional parts which are disposed in the rear portion of a head lamp and other parts, so that the freedom of design of the cooling structure can be enhanced.

By the way, the invention is not limited to the above illustrated embodiment. For example, the support members 33 and the like, which are used to mount the main radiator 4 and auxiliary radiators 6, are just examples and thus the main and auxiliary radiators can also be mounted using other members. Also, in the illustrate embodiment, the cooling structure is structured such that the drive motor 3 and the power control unit 50 of the drive motor 3 are cooled by the auxiliary radiators 6; however, one of them may be cooled, or other heat generating devices maybe cooled. Further, in the illustrated embodiment, the auxiliary radiators 6 are disposed on the two sides of the main radiator 4; however, an auxiliary radiator 6 may also be disposed on one side of the main radiator 4. In this case, on the other side of the main radiator 4, there may be disposed an air conditioner condenser for air-conditioning the interior of the vehicle room.

As has been described heretofore, according to the first aspect of the invention, not only the fuel cell and drive motor (or the power control unit of the drive motor) can be cooled independently of each other, but also the main and auxiliary radiators can be prevented from being thermally influenced by each other. This can provide an effect that the cooling states of the fuel cell and drive motor can be controlled optimally with high efficiency.

According to the second aspect of the invention, in case where the fuel cell and drive motor (or the power control unit of the drive motor) can be cooled independently of each other using the main and auxiliary radiators disposed with the main frames between them, the main and auxiliary radiators can be partitioned from each other with the main frames, which can prevent the main and auxiliary radiators from being thermally influenced by each other. This can also provide an effect that the cooling states of the fuel cell and drive motor can be controlled optimally with high efficiency.

According to the third aspect of the invention, because the exhaust air of the auxiliary radiator can be made to join the exhaust air of the main radiator and the exhaust air can be discharged together, thereby allowing the exhaust air to flow smoothly. This can provide an effect that high-efficiency cooling with little exhaust air stagnation can be realized.

According to the fourth aspect of the invention, since the exhaust air is directed downwardly, not only the air ventilation efficiency can be enhanced to thereby improve the cooling performance of the cooling structure, but also the crashable zone of the front portion of the vehicle can be secured large by an amount corresponding to the backwardly retreated upper portion of the main radiator to thereby be able to enhance the safety of the vehicle body. Thanks to this, the front height of the vehicle body can be reduced to thereby be able not only to enhance the freedom of design of the vehicle body but also secure the visually confirming performance of the vehicle body for the driver.

According to the fifth aspect of the invention, because the exhaust air from the radiators can be prevented from flowing into each other, the cooling performance of the cooling structure can be enhanced.

According to the sixth aspect of the invention, since the auxiliary radiator has no ill influences on the freedom of arrangement of functional parts which are disposed in the rear of a head lamp and other parts, the freedom of design of the cooling structure can be enhanced.

What is claimed is:

1. A cooling structure for a fuel cell vehicle, comprising:
   a fuel cell;
   a drive motor for driving the fuel cell vehicle using the energy generated by the fuel cell;
   a first cooling flow passage for cooling the fuel cell using a first cooling medium cooled by a main radiator; and
   a second cooling flow passage for cooling at least one of the drive motor and a power control unit of the drive motor using a second cooling medium cooled by an auxiliary radiator,
   wherein the second cooling flow passage is thermally independent from the first cooling flow passage, and
   wherein the main radiator is disposed in a central portion of a front surface of a vehicle body and the auxiliary radiator is disposed on the front surface of the vehicle body in such a manner that its heat exchange surface is situated shifted in a vehicle-width direction so as to prevent it from being overlapped with a heat exchange surface of the main radiator.

2. A cooling structure for a fuel cell vehicle, comprising:
   a fuel cell;
   a drive motor for driving the fuel cell vehicle using the energy generated by the fuel cell;
   a first cooling flow passage for cooling the fuel cell using a first cooling medium cooled by a main radiator; and
   a second cooling flow passage for cooling at least one of the drive motor and a power control unit of the drive motor using a second cooling medium cooled by an auxiliary radiator,
   wherein the second cooling flow passage is thermally independently from the first cooling flow passage, and
   wherein the main radiator is disposed on a front surface of the vehicle body so as to extend substantially over a vehicle-width-direction entire area existing between a pair of right and left main frames respectively disposed along a back-and-forth direction of the vehicle body, and the auxiliary radiator is disposed on the front surface of the vehicle body in such a manner that it is situated outside the main frames.

3. A cooling structure for a fuel cell vehicle as set forth in claim 1, wherein the auxiliary radiator is disposed in such a manner that its heat exchange surface faces obliquely forwardly and outwardly.

4. A cooling structure for a fuel cell vehicle as set forth in claim 2, wherein the auxiliary radiator is disposed in such a manner that its heat exchange surface faces obliquely forwardly and outwardly.

5. A cooling structure for a fuel cell vehicle as set forth in claim 1, wherein the main radiator is disposed in such a manner that its heat exchange surface faces obliquely upwardly and forwardly.

6. A cooling structure for a fuel cell vehicle as set forth in claim 2, wherein the main radiator is disposed in such a manner that its heat exchange surface faces obliquely upwardly and forwardly.

7. A cooling structure for a fuel cell vehicle as set forth in claim 1, further comprising:
   a seal member for closing a space existing between the main and auxiliary radiators, the seal member being interposed between the main radiator and the auxiliary radiator.

8. A cooling structure for a fuel cell vehicle as set forth in claim 2, further comprising:
   a seal member for closing a space existing between the main and auxiliary radiators, the seal member being interposed between the main radiator and the auxiliary radiator.

9. A cooling structure for a fuel cell vehicle as set forth in claim 1, wherein an installation height of the auxiliary radiator is set lower than the main radiator.

10. A cooling structure for a fuel cell vehicle as set forth in claim 2, wherein an installation height of the auxiliary radiator is set lower than the main radiator.

* * * * *